(12) United States Patent
Hwang et al.

(10) Patent No.: US 11,362,396 B2
(45) Date of Patent: Jun. 14, 2022

(54) APPARATUS FOR COLLECTING GAS IN SECONDARY BATTERY

(71) Applicant: LG CHEM, LTD., Seoul (KR)

(72) Inventors: Dongguk Hwang, Daejeon (KR); Won Kyung Shin, Daejeon (KR); Junghyun Song, Daejeon (KR); Nak Hee Choi, Daejeon (KR); Jeong Ae Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 17/263,672

(22) PCT Filed: Apr. 20, 2020

(86) PCT No.: PCT/KR2020/005195
§ 371 (c)(1),
(2) Date: Jan. 27, 2021

(87) PCT Pub. No.: WO2020/218785
PCT Pub. Date: Oct. 29, 2020

(65) Prior Publication Data
US 2021/0218107 A1 Jul. 15, 2021

(30) Foreign Application Priority Data

Apr. 26, 2019 (KR) .................. 10-2019-0049124

(51) Int. Cl.
*H01M 50/342* (2021.01)
*H01M 10/04* (2006.01)
*H01M 10/42* (2006.01)
*G01N 1/22* (2006.01)

(52) U.S. Cl.
CPC .......... *H01M 50/3425* (2021.01); *G01N 1/22* (2013.01); *H01M 10/0481* (2013.01); *H01M 10/4285* (2013.01)

(58) Field of Classification Search
None
See application file for complete search history.

(56) References Cited

U.S. PATENT DOCUMENTS

2016/0380302 A1* 12/2016 Yun .................. H01M 10/0431
29/623.5

FOREIGN PATENT DOCUMENTS

| CN | 207572483 U | 7/2018 |
|---|---|---|
| EP | 2 003 435 A2 | 12/2008 |
| EP | 3 696 902 A1 | 8/2020 |
| JP | 2001-332312 A | 11/2001 |

(Continued)

*Primary Examiner* — Lisa S Park
(74) *Attorney, Agent, or Firm* — Dentons US LLP

(57) ABSTRACT

A gas-collecting apparatus for collecting gas generated in a secondary battery including an electrode assembly and a rigid battery case accommodating the electrode assembly therein, the gas-collecting apparatus comprising: a pressing jig part for pressing one surface of the battery case; a gas collecting pipe provided with the pressing jig part; a sealing part inserted between the pressing jig part and one surface of the battery case; and a fixing unit for fixing the pressing jig part and the battery case with the sealing member inserted between the pressing jig part and the battery case, and the gas-collecting apparatus capable of easily collecting the gas regardless of the standard size and shape of the secondary battery.

11 Claims, 7 Drawing Sheets

(56) References Cited

FOREIGN PATENT DOCUMENTS

| | | | |
|---|---|---|---|
| JP | 2011-003513 | A | 1/2011 |
| KR | 10-0832245 | B1 | 5/2008 |
| KR | 10-2015-0062739 | A | 6/2015 |
| KR | 20150062739 | A * | 6/2015 |
| KR | 10-2015-0107102 | A | 9/2015 |
| KR | 20150107102 | A * | 9/2015 |
| KR | 10-1590395 | B1 | 2/2016 |
| KR | 10-1634310 | B1 | 7/2016 |
| KR | 101634310 | B1 * | 7/2016 |
| KR | 10-2018-0047274 | A | 5/2018 |
| KR | 10-2018-0047280 | A | 5/2018 |

\* cited by examiner

[Fig. 1]
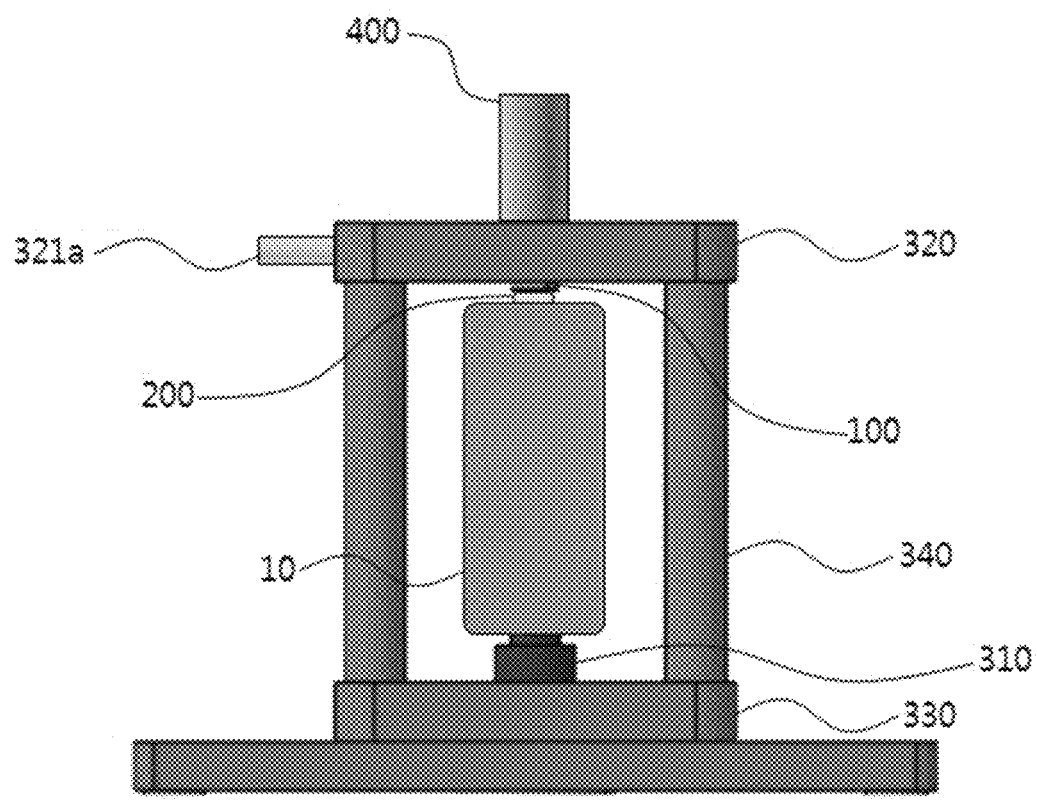

[Fig. 2]
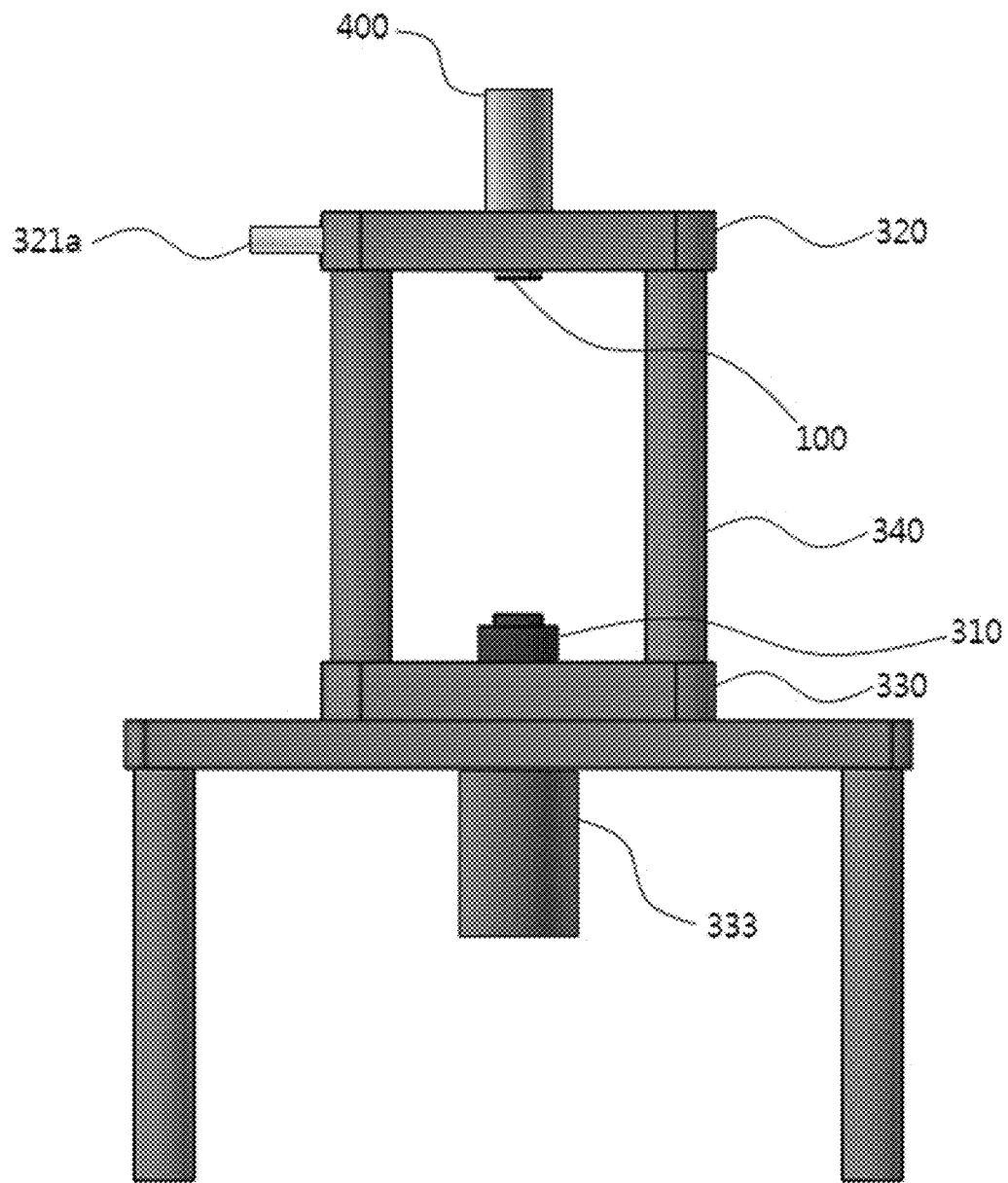

[Fig. 3]
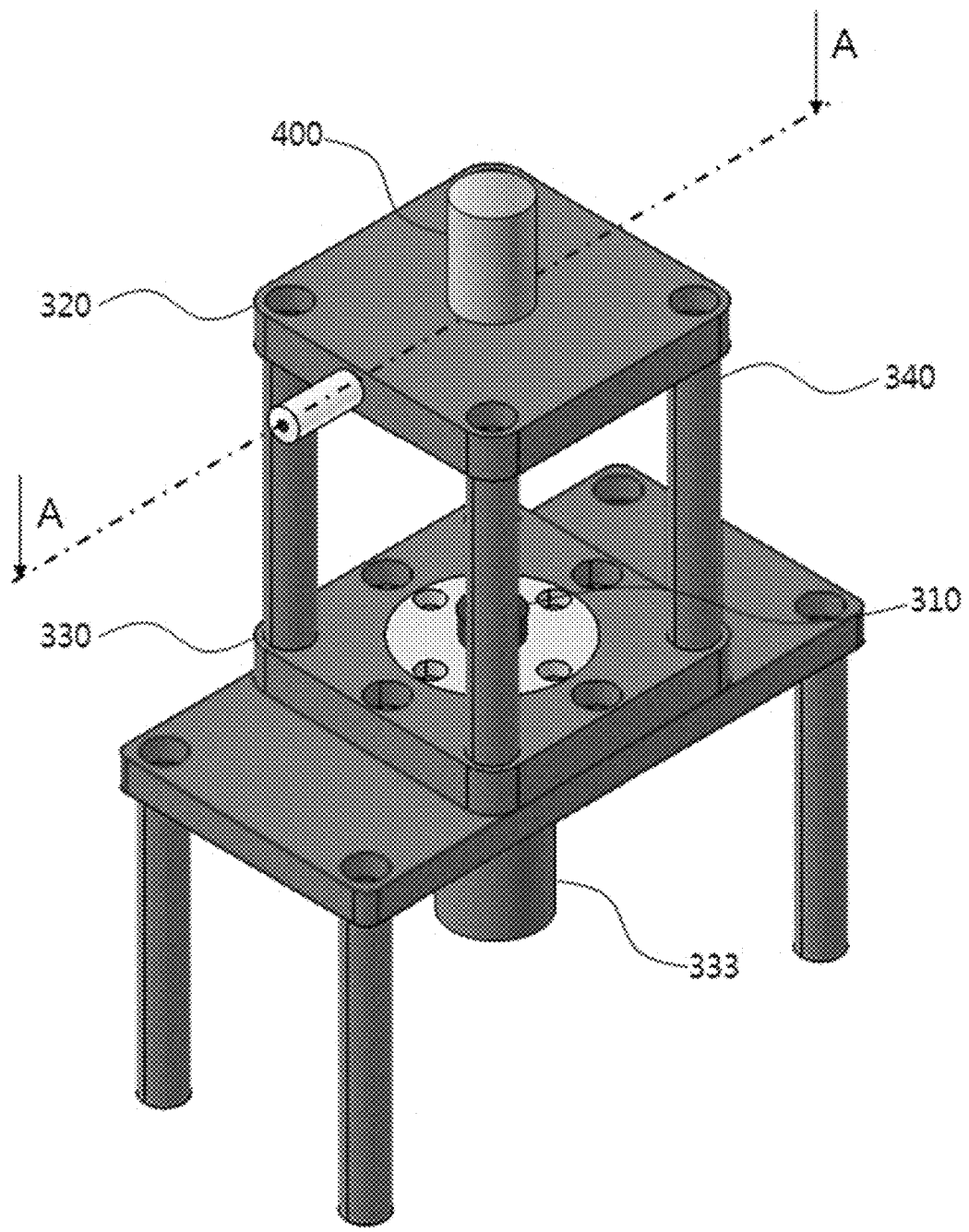

[Fig. 4]
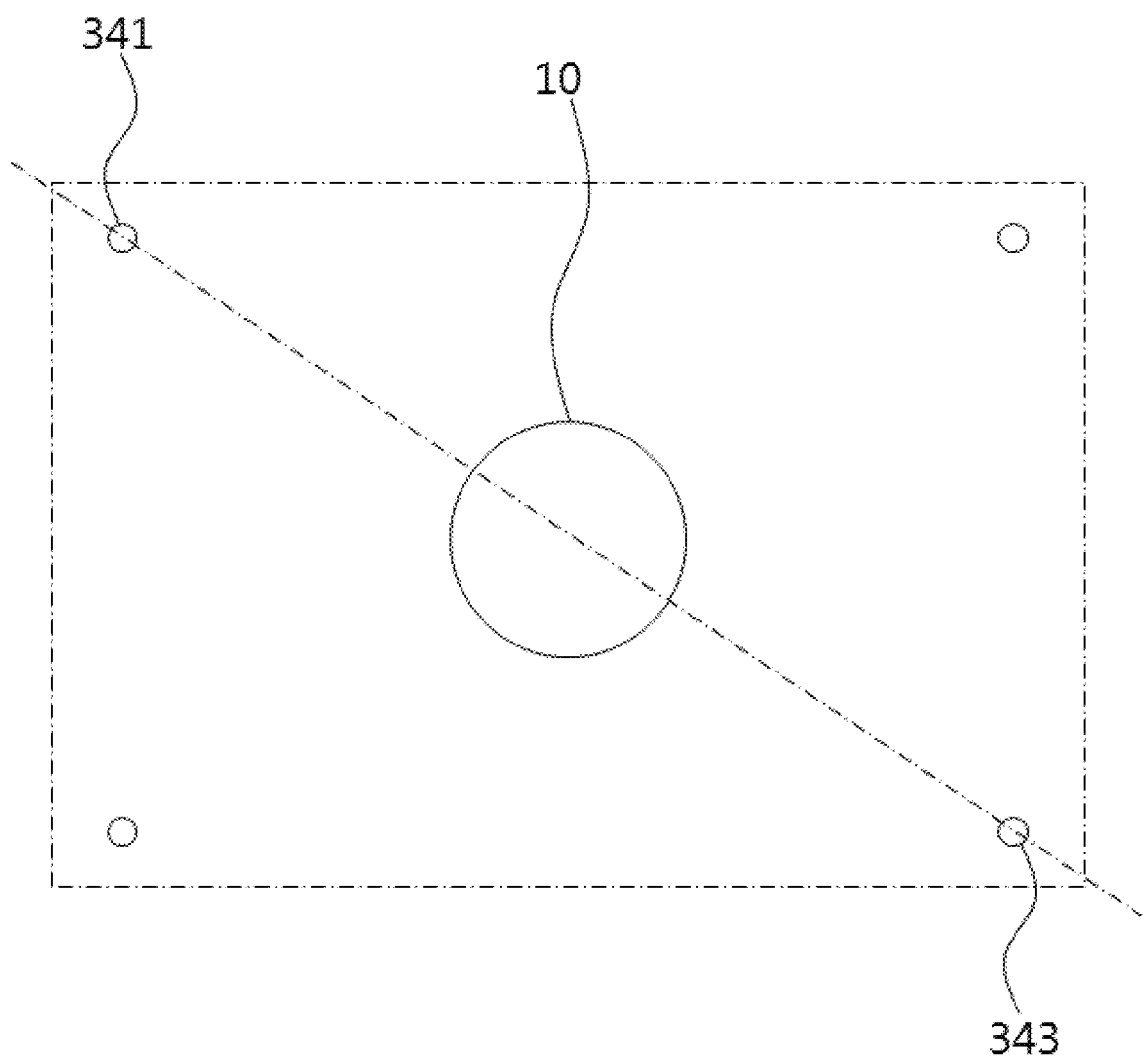

[Fig. 5]
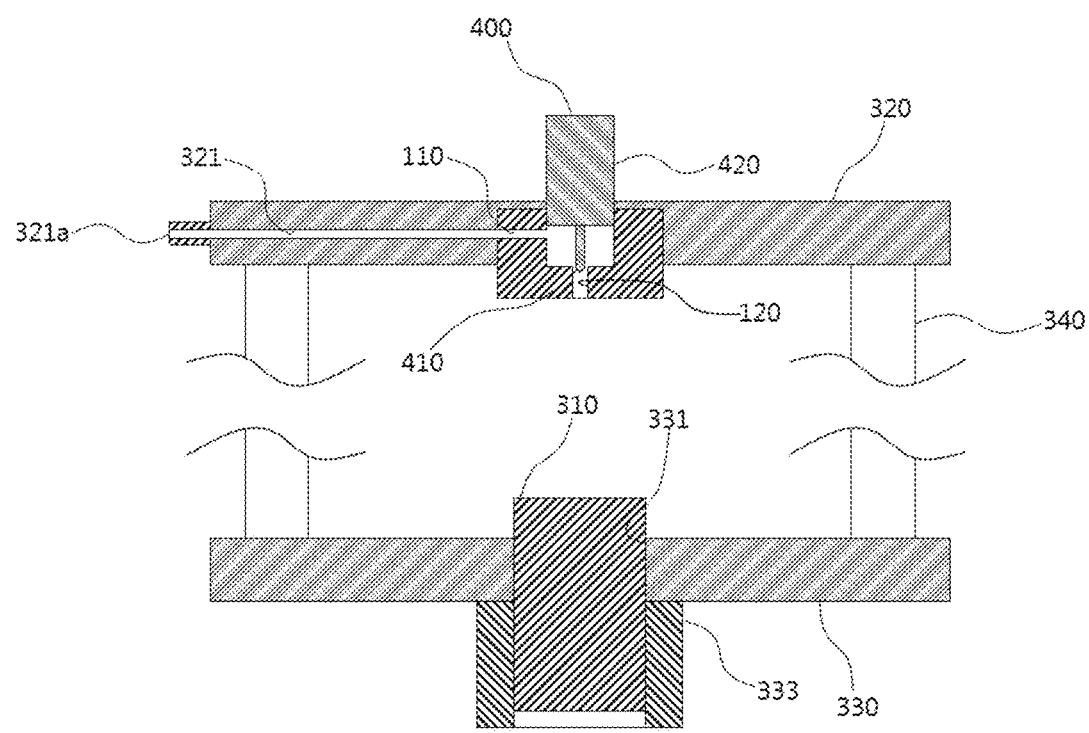

[Fig. 6]
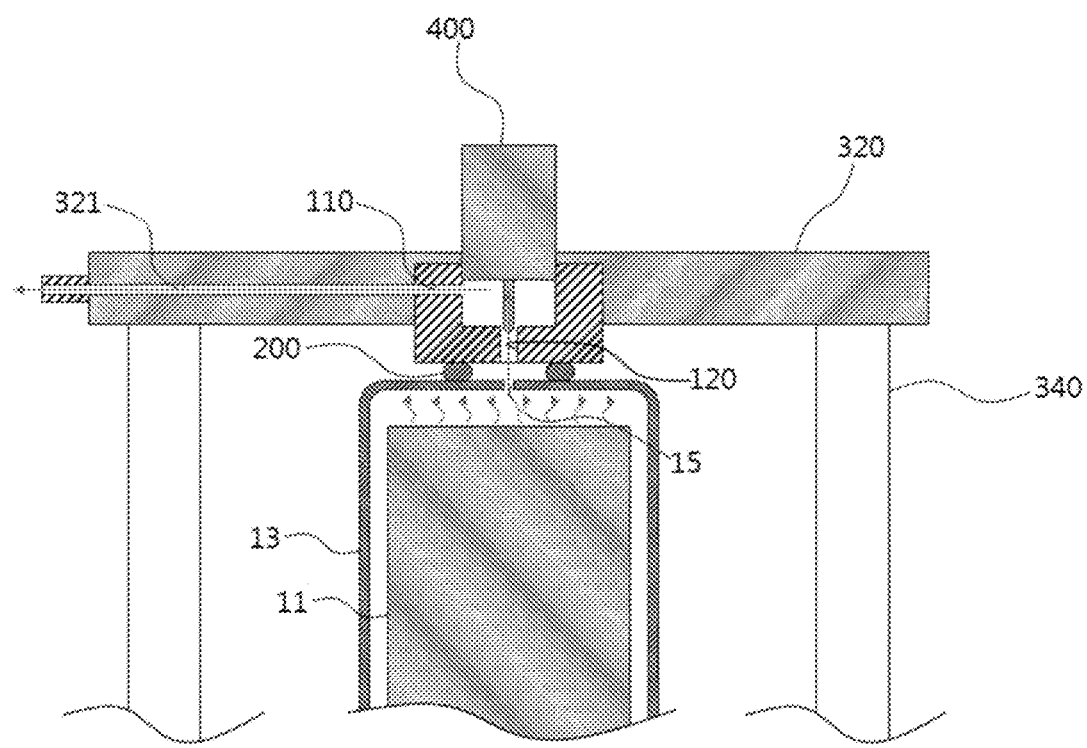

[Fig. 7]
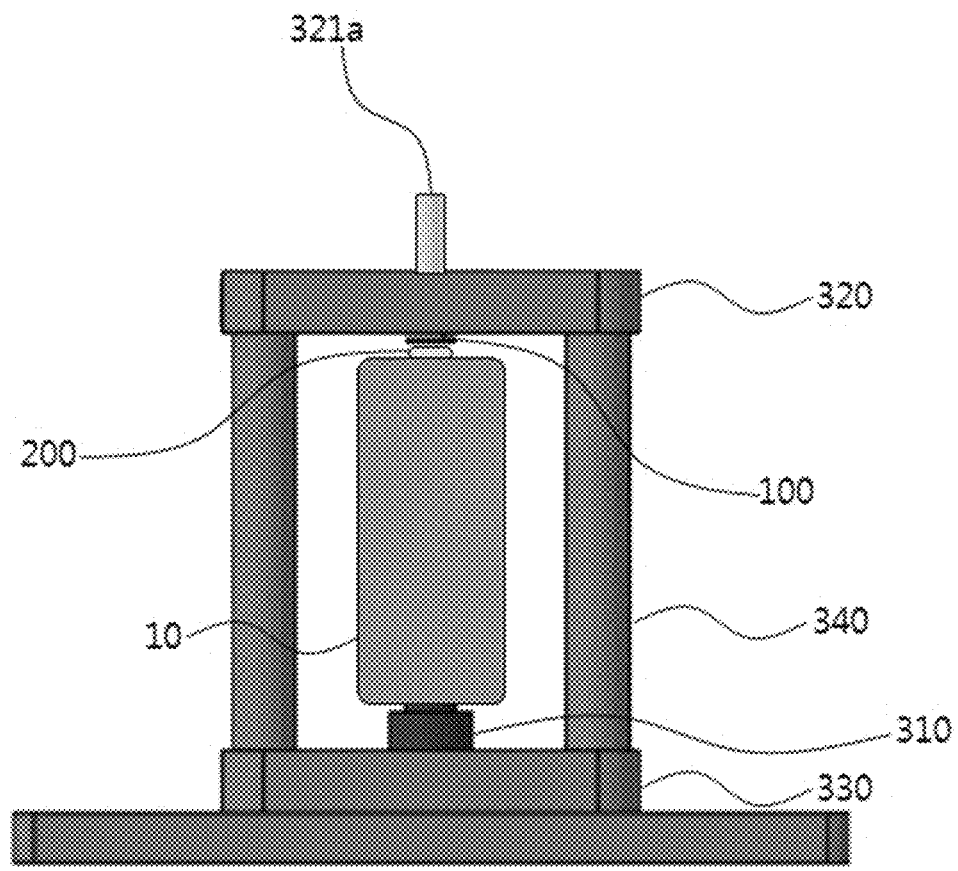

APPARATUS FOR COLLECTING GAS IN SECONDARY BATTERY

CROSS-REFERENCE TO RELATED APPLICATIONS

The present application is a National Stage Application of International Application No. PCT/KR2020/005195, filed on Apr. 20, 2020, which claims priority to Korean Patent Application No. 10-2019-0049124 filed on Apr. 26, 2019, the disclosures of which are incorporated herein by reference in their entireties by reference.

TECHNICAL FIELD

The present disclosure relates to a gas-collecting apparatus for collecting gas in a secondary battery, and more particularly, to a gas-collecting apparatus capable of easily collecting gas inside a secondary battery regardless of the standard size and the shape of the secondary battery.

BACKGROUND

In general, a secondary battery is a battery which can be repeatedly used through a discharging process converting chemical energy into electrical energy and a reverse process, a charging process, and includes, as its kind, a nickel-cadmium (Ni—Cd) battery, a nickel-hydrogen (Ni—MH) battery, a lithium-metal battery, a lithium-ion (Li-ion) battery, a lithium-ion polymer battery, etc. Among these secondary batteries, the lithium secondary batteries, which have a high energy density and voltage, a long cycle life and a low self-discharge rate, have been commercialized and widely used.

Various kinds of gases, such as hydrogen, oxygen, nitrogen, carbon monoxide, carbon dioxide, hydrocarbons such as $C_nH_{2n-2}$ (n=2~5), $C_nH_{2n}$ (n=2~5) and $C_nH_{2n+2}$ (n=1~5), other organic gas species, etc. may be generated depending on the reaction in the lithium secondary battery.

In addition, the lithium secondary battery is degraded as a large amount of gas is generated by the decomposition of an electrolyte according to repeated charging and discharging progresses, and this phenomenon appears differently depending on the design and use type of the battery. Therefore, analyzing the gas generated inside the battery to infer the degradation mechanism of the battery should essentially be performed in the development process of the battery.

Therefore, it is very important to collect and accurately analyze the gas generated in the secondary battery. Various gases are generated during operation of the lithium ion battery, and information on the composition and content of the generated gases is useful for the development of battery materials, optimization of battery manufacturing processes, and identification of causes of battery defects. To this end, it is important to develop a technology for collecting the gas generated inside the secondary battery.

Conventionally, in order to collect the gas generated in the secondary battery, the secondary battery was placed in a closed space, which was depressurized under vacuum, and then, a hole was drilled in the secondary battery to diffuse the generated gas into the closed space accommodating the secondary battery, and then, a sample was taken. Therefore, a jig is needed to enclose the entire exterior of the secondary battery to form a closed space for accommodating the secondary battery, and this jig is required to have a form conforming to the specification and shape of each different type of the secondary batteries released for various purposes (EV, ESS, mobile phone, etc.). That is, in the conventional gas collecting apparatus, since the secondary battery has various specifications such as area, thickness, etc., it is necessary to replace the jig whenever the shape and specification of the secondary battery to be inspected are changed.

In addition, in order to remove gases other than the sample gas formed in the closed space after the closed space was formed, additional equipment such as a vacuum pump, an inert gas injecting apparatus and the like were required.

Korean Laid-Open Patent Publication No. 10-2018-0047280 discloses a technique concerned with 'an apparatus and a method for collecting gas generated in a secondary battery'.

SUMMARY

Technical Problem

It is an object of the present disclosure to provide a gas-collecting apparatus for collecting gas in a secondary battery, and more particularly, a gas-collecting apparatus capable of easily collecting gas inside a secondary battery regardless of the specification and shape of the secondary battery.

The technical problems to be solved by the present disclosure are not limited to the technical problems as mentioned above, and other technical problems not mentioned will be clearly understood from the following description by those skilled in the art to which the present disclosure pertains.

Technical Solution

A gas-collecting apparatus for a secondary battery of the present disclosure is the apparatus for collecting gas generated in a secondary battery comprising an electrode assembly and a rigid battery case accommodating the electrode assembly therein, wherein the apparatus comprises: a pressing jig part for pressing one surface of the battery case; a sealing part inserted between the pressing jig part and the one surface of the battery case; and a fixing unit for fixing the pressing jig part and the battery case in a state that the sealing means is inserted between the pressing jig part and the battery case, wherein the pressing jig part may be provided with a gas collecting pipe through which the gas generated inside the battery case flows.

Advantageous Effects

The gas-collecting apparatus for a secondary battery of the present disclosure can be utilized consistently for secondary batteries of all sizes regardless of a change in the specifications of the batteries.

The gas-collecting apparatus of the present disclosure immediately collects gas inside a battery case without requiring a process of diffusing the gas in a separate chamber, thereby reducing a space for gas diffusion. Therefore, since the gas generated in the secondary battery can be collected in a smaller space, it is possible to increase the efficiency of analysis by collecting a high concentration of gas.

A pressing jig part of the gas-collecting apparatus of the present disclosure contacts and presses only a local area of a battery case, and therefore, even if the jig is coupled to the secondary battery, the secondary battery has an exposed area that is not coupled to the jig. This exposed area can be used to connect accessory parts for various analyses.

The gas-collecting apparatus of the present disclosure securely fixes a pressing jig part to only one surface of a battery case, and therefore, even if the shape and size of the secondary battery changes during the analysis, it is possible to smoothly collect the gas without replacing the jig.

Even if the gas-collecting apparatus of the present disclosure is damaged by ignition of the secondary battery, only a pressing jig part or a sealing part needs to be replaced, thereby reducing the maintenance cost of the apparatus.

In the case of an O-ring applied to the structure of the gas-collecting apparatus of the present disclosure, its area is 2 to 1000 times smaller than that of the O-ring used in the conventional collecting apparatuses, thereby effectively improving leakage due to the O-ring.

DESCRIPTION OF DRAWINGS

FIG. 1 is a plan view showing a state in which a secondary battery is coupled to a gas-collecting apparatus according to one embodiment of the present invention.

FIG. 2 is a plan view showing a state in which a secondary battery is not mounted to the gas-collecting apparatus in FIG. 1.

FIG. 3 is a perspective view showing the gas-collecting apparatus in FIG. 1.

FIG. 4 is a conceptual view showing an arranged relationship of a pillar part of the gas-collecting apparatus in FIG. 1.

FIG. 5 is a cross-sectional view showing a cross-section A-A in FIG. 3.

FIG. 6 is a cross-sectional view showing a gas flow in the gas-collecting apparatus in FIG. 1.

FIG. 7 is a plan view showing another embodiment of a gas-collecting apparatus of the present invention.

BEST MODE FOR DISCLOSURE

A gas-collecting apparatus of the present disclosure is the apparatus for collecting gas generated in a secondary battery comprising an electrode assembly and a rigid battery case accommodating the electrode assembly therein, wherein the apparatus comprises: a pressing jig part for pressing one surface of the battery case; a sealing part inserted between the pressing jig part and the one surface of the battery case; and a fixing unit for fixing the pressing jig part and the battery case in a state that the sealing means is inserted between the pressing jig part and the battery case, wherein the pressing jig part may be provided with a gas collecting pipe through which the gas generated inside the battery case flows.

In the gas-collecting apparatus of the present disclosure, when the one surface of the battery case is referred to as a first surface, and the other surface of the battery case facing the first surface is referred to as a second surface, the fixing unit may include: a supporting jig part contacting the second surface to support the secondary battery; a first plate to which the pressing jig part is fixed and which faces the first surface at a position spaced apart therefrom; a second plate to which the supporting jig part is fixed and which faces the second surface at a position spaced apart therefrom; and a pillar part coupled to the first plate and the second plate so that the first plate and the second plate maintain a certain distance from each other.

In the gas-collecting apparatus of the present disclosure, the second plate may be provided with a jig guide hole in which the supporting jig part is inserted so as to be movable in a direction perpendicular to the first surface with respect to the second plate; and a locking means for fixing a relative position of the supporting jig part with respect to the second plate.

In the gas-collecting apparatus of the present disclosure, a gas discharging pipe for flowing the gas discharged through the gas collecting pipe to an external analysis apparatus may be provided inside the first plate; the pressing jig part may be in contact with and coupled to the first plate; the gas collecting pipe may be a gas flow path formed inside the pressing jig part; an inlet of the gas collecting pipe may be formed to face the first surface; and an outlet of the gas collecting pipe may be formed on a contacting surface between the first plate and the pressing jig part so as to face an inlet of the gas discharging pipe.

In the gas-collecting apparatus of the present disclosure, the pillar part extends in a direction perpendicular to the first surface and is provided in plural, wherein one end of the pillar part may be coupled to the first plate, and the other end of the pillar part may be coupled to the second plate.

In the gas-collecting apparatus of the present disclosure, the pillar part includes a first pillar part and a second pillar part, wherein a virtual line connecting the first pillar part and the second pillar part on a virtual plane including the secondary battery, the first pillar part and the second pillar part and being parallel to the first surface may penetrate the secondary battery.

In the gas-collecting apparatus of the present disclosure, it further includes a punching part for drilling a ventilating hole on the first surface of the battery case for discharging the gas, wherein the punching part is coupled to a surface of the pressing jig part opposite to a surface of the pressing jig part contacting the secondary battery; and a needle hole penetrating the inside of the pressing jig part may be formed in the pressing jig part so that a needle provided in the punching part protrudes from the surface of the pressing jig part contacting the secondary battery.

In the gas-collecting apparatus of the present disclosure, an outlet of the needle hole through which the needle protrudes and an inlet of the gas collecting pipe through which the gas flows in may be formed at the same position.

In the gas-collecting apparatus of the present disclosure, the needle hole is formed to penetrate the pressing jig part so as to connect the surface of the pressing jig part facing the battery case and the surface of the pressing jig part to which the punching part is coupled; the punching part is detachable; and the gas inside the secondary battery can be collected through the needle hole in a state that the punching part is separated from the pressing jig part.

In the gas-collecting apparatus of the present disclosure, a ventilating hole for discharging the gas generated inside the secondary battery may be formed in the one surface of the battery case; the sealing part may be an O-ring; and the sealing part may be disposed such that the ventilating hole is located inside a circle of the O-ring.

In the gas-collecting apparatus of the present disclosure, the sealing part may include one or more of silicone rubber, viton, natural rubber and synthetic rubber as a flexible material.

DETAILED DESCRIPTION OF EMBODIMENTS

Hereinafter, embodiments according to the present invention will be described in detail with reference to the accompanying drawings. In the description, the size, shape or the like of elements shown in the drawings may be exaggerated for clarity and convenience of the description. In addition, terms specifically defined in consideration of the constitution and function of the present invention may vary depending on the intention or practice of a user or operator. Definitions of these terms should be made based on the contents disclosed throughout this specification.

In the description of the present invention, it should be noted that a directional or positional relationship indicated by the terms "center", "upper", "lower", "left", "right", "vertical", "horizontal", "inside", "outside", etc. is based on a directional or positional relationship shown in the drawings, or a directional or positional relationship that is usually arranged when using the product of the present invention; and such directional or positional relationship is only for the illustration and concise description of the present invention and does not necessarily suggest or imply that the indicated apparatus or element must have a specified direction and must be constructed or manipulated with the specified direction, and thus, should not be construed as limiting the present invention.

Hereinafter, the configuration and function of the gas-collecting apparatus of the present disclosure will be described in detail with reference to FIGS. 1 to 7.

FIG. 1 is a plan view showing a state in which a secondary battery is coupled to a gas-collecting apparatus according to one embodiment of the present invention. FIG. 2 is a plan view showing a state in which a secondary battery is not mounted to the gas-collecting apparatus in FIG. 1. FIG. 3 is a perspective view showing the gas-collecting apparatus in FIG. 1. FIG. 4 is a conceptual view showing an arranged relationship of a pillar part of the gas-collecting apparatus in FIG. 1. FIG. 5 is a cross-sectional view showing a cross-section A-A in FIG. 3. FIG. 6 is a cross-sectional view showing a gas flow in the gas-collecting apparatus in FIG. 1. FIG. 7 is a plan view showing another embodiment of a gas-collecting apparatus of the present invention.

The gas-collecting apparatus of the present disclosure may be used for collecting gas generated in a secondary battery 10 comprising an electrode assembly 11 and a rigid battery case 13 for accommodating the electrode assembly 11 therein. That is, in the gas-collecting apparatus of the present disclosure, the battery case 13 constituting an outer shape has a fixed volume and may be a rigid material. Specifically, the battery case 13 may be made of a stainless steel, and may have a shape that is maintained even when the pressure inside and outside the battery case 13 changes. Therefore, when an outer surface of the battery case 13 is pressed with a pressing jig part 100, the battery case 13 withstands it, and the outer surface of the battery case 13 and the pressing jig part 100 may be in close contact with each other. The secondary battery 10 used in the apparatus of the present disclosure may have an outer shape formed of, for example, a prismatic or cylindrical hard case.

As shown in FIG. 1, the gas-collecting apparatus of the present disclosure may comprise: a pressing jig part 100 for pressing one surface of the battery case 13, a sealing part 200 inserted into between the pressing jig part 100 and the one surface of the battery case 13, and a fixing unit for fixing the pressing jig part 100 and the battery case 13 in a state that the sealing means is inserted between the pressing jig part 100 and the battery case 13.

One surface of the battery case 13 facing the pressing jig part 100 is defined as a first surface, and the other surface of the battery case 13 facing the first surface is defined as a second surface.

As shown in FIGS. 2 and 3, the fixing unit may include: a supporting jig part 310 contacting the second surface to support the secondary battery 10; a first plate 320 to which the pressing jig part 100 is fixed and which faces the first surface at a position spaced apart therefrom; a second plate 330 to which the supporting jig part 310 is fixed and which faces the second surface at a position spaced apart therefrom; and a pillar part 340 coupled to the first plate 320 and the second plate 330 so that the first plate 320 and the second plate 330 maintain a certain distance from each other.

The supporting jig part 310 may apply a force to the second surface, which is a surface opposite to the first surface of the battery case 13 which is pressed by the pressing jig part 100, in a direction opposite to a direction of the force applied by the pressing jig part 100 to the secondary battery 10, with the secondary battery 10 interposed therebetween. That is, the secondary battery 10 may be sandwiched between the pressing jig part 100 and the supporting jig part 310 and be fixed in place. A relative spacing between the pressing jig part 100 and the supporting jig part 310 may be adjusted, and the secondary battery 10 can be fixed between the pressing jig part 100 and the supporting jig part 310 by adjusting the spacing according to the size of the secondary battery 10.

The spacing between the pressing jig part 100 and the supporting jig part 310 may be adjusted according to the specification of the secondary battery 10. Since a spacing between the first plate 320 and the second plate 330 is always constant, the spacing between the pressing jig part 100 and the supporting jig part 310 cab be adjusted by moving the pressing jig part 100 in a direction perpendicular to the first surface with respect to the first plate 320, or by moving the supporting jig part 310 in a direction perpendicular to the first surface with respect to the second plate 330. Since a gas collecting pipe 110, a punching part 400, etc. may be coupled to the pressing jig part 100, it may be desirable to adjust the spacing by moving the supporting jig part 310.

Specifically, the second plate 330 may be provided with a jig guide hole 331 in which the supporting jig part 310 is inserted so as to be movable in a direction perpendicular to the first surface with respect to the second plate 330; and a locking means 333 for fixing a relative position of the supporting jig part 310 with respect to the second plate 330.

The jig guide hole 331 is formed to penetrate the second plate 330 in a direction perpendicular to the first surface, and the supporting jig part 310 can be guided and moved by the jig guide hole 331.

The locking means 333 is provided on a surface opposite to a surface of the second plate 330 facing the battery case 13, and may fix the supporting jig part 310 by tightening the side surface of the supporting jig part 310.

The pillar part 340, which fixes the first plate 320 and the second plate 330 so that the relative distance between them is always constant, extends in a direction perpendicular to the first surface, and may be provided in plural. One end of the pillar part 340 may be coupled to the first plate 320, and the other end of the pillar part 340 may be coupled to the second plate 330.

As shown in FIG. 4, when the pillar part 340 includes a first pillar part 341 and a second pillar part 343, a virtual line connecting the first pillar part 341 and the second pillar part 343 on a virtual plane including the secondary battery, the first pillar part 341 and the second pillar part 343 and being parallel to the first surface may penetrate the secondary battery 10. That is, the first pillar part 341 and the second pillar part 343 may be disposed to interpose the secondary battery 10 therebetween.

Since the gas-collecting apparatus of the present disclosure does not accommodate the secondary battery 10 in an enclosed space, but fixes the jigs through the pillar part 340, the side surface of the battery case 13 may be open to the outside. That is, since the apparatus is not a structure in which the jig encloses the entire secondary battery 10, it may be easy to directly couple additional separate equipment (charger-discharger, compactor, insulating material, temperature sensor, etc.) to the secondary battery 10. Therefore, it is possible to collect not only the gas at the time of connecting a secondary battery internal gas-analyzing apparatus of the present disclosure to the secondary battery 10, but also the gas generated in real time for each change in voltage, temperature or elapsed time inside the secondary battery 10.

As shown in FIG. 5, the gas-collecting apparatus of the present disclosure may further include a punching part 400 for drilling a ventilating hole 15 for discharging the gas on the first surface of the battery case 13. The punching part 400 may be coupled to a surface of the pressing jig part 100 opposite to a surface of the pressing jig part 100 contacting the secondary battery 10. A needle hole 120 penetrating an inside of the pressing jig part 100 may be formed in the pressing jig part 100 so that a needle 410 provided in the punching part 400 protrudes from a surface of the pressing jig part 100 contacting the secondary battery 10.

Specifically, the punching part 400 may include a needle 410 for drilling the ventilating hole 15 in the battery case 13, a body part 420 having one end to which the needle 410 is fixed and having a diameter larger than a diameter of the needle 410, a button (not shown) connected to the other end of the body part 420 to press the body part 420, and an elastic member (not shown) providing a restoring force for the body part 420 to move the body part 420 to its original position after the needle 410 forms the ventilating hole 15 by pressing the body part 420. A portion of the body part 420 may be inserted into the needle hole 120 formed in the pressing jig part 100, and the body part 420 may reciprocate along the needle hole 120. The needle hole 120 may be formed to penetrate the pressing jig part 100 in a direction perpendicular to a surface of the pressing jig part 100 facing the battery case 13. A diameter of some sections of the needle hole 120 into which the body part 420 is inserted is formed to be substantially the same as a diameter of the body part 420, and a sealing member (not shown) may be inserted between an inner surface of the needle hole 120 and a side surface of the body part 420. A groove into which the sealing member is inserted may be formed in the body part 420.

The needle 410 protrudes to an inlet of the needle hole 120 formed on a surface of the pressing jig part 100 facing the battery case 13 to form a ventilating hole 15 in the battery case 13. The inlet of the needle hole 120 formed on the surface of the pressing jig part 100 facing the battery case 13 may be the same hole as an inlet of the gas collecting tube 110, and the needle hole 120 and the gas collecting tube 110 may share some sections. That is, an outlet of the needle hole 120 through which the needle 410 protrudes and an inlet of the gas collecting pipe 110 through which gas flows in may be formed at the same position. Since the ventilating hole 15 formed in the battery case 13 is formed by the needle 410 protruding from the inlet of the gas collecting tube 110, the ventilating hole 15 and the inlet of the gas collecting tube 110 can naturally face each other without a separate position alignment.

The pressing jig part 100 may be provided with a gas collecting pipe 110 through which the gas generated in the battery case 13 flows. The gas collecting pipe 110 may be a flow path through which the gas formed inside the pressing jig part 100 flows. An inlet of the gas collecting pipe 110 may be formed on a surface of the pressing jig part 100 facing the battery case 13. Therefore, the gas discharged from the secondary battery 10 flows into the inlet of the gas collecting pipe 110, and the gas introduced into the gas collecting pipe 110 may be discharged to an external analysis apparatus via the gas collecting pipe 110.

As an embodiment, as shown in FIG. 6, a gas discharging pipe 321 for flowing the gas discharged through the gas collecting pipe 110 to an external analysis apparatus may be provided inside the first plate 320. In a state that the pressing jig part 100 and the first plate 320 are contacted and coupled to each other, an outlet of the gas collecting pipe 110 may be formed on a contacting surface between the first plate 320 and the pressing jig part 100 so as to face an inlet of the gas discharging pipe 321. Therefore, the gas discharged through the pressing jig part 100 may be delivered to an external analysis apparatus via the gas discharging pipe 321 formed inside the first plate 320. That is, the gas generated in the electrode assembly 11 may flow through the gas collecting pipe 110 of the pressing jig part 100 and the gas discharging pipe 321 of the first plate 320 to an external analysis apparatus. The gas-collecting apparatus of the present disclosure basically collects the gas inside the secondary battery, but on the contrary, it is possible to analyze a change in the state of the secondary battery by injecting external air into the secondary battery in a reverse direction of the path.

A fastening part 321a protruding from a surface of the first plate 320 may be provided at an outlet of the gas discharging pipe 321 so as to facilitate the fastening of a pipe such as a hose.

The sealing part 200 may be an O-ring. The sealing part 200 may be disposed such that the ventilating hole 15 is located inside a circle of the O-ring. The sealing part 200 may include one or more of silicone rubber, viton, natural rubber and synthetic rubber as a flexible material. The sealing part 200 is directly exposed to the gas generated in the secondary battery 10, and thus, its material may preferably have properties such as corrosion resistance, heat resistance, abrasion resistance and chemical resistance. When the sealing part 200 formed of a flexible material is pressed by the pressing jig part 100, it may be deformed to fill and seal a gap between the sealing part 200 and the pressing jig part 100 and a gap between the sealing part 200 and the battery case 13.

As another embodiment, as shown in FIG. 7, the punching part 400 is detachable, and the gas inside the secondary battery can be collected through the needle hole 120 in a state that the punching part 400 is separated from the pressing jig part 100. The needle hole 120 may be formed to penetrate the pressing jig part 100 so as to connect a surface of the pressing jig part 100 facing the battery case 13 and a surface of the pressing jig part 100 to which the punching part 400 is coupled; and the gas in the secondary battery 10 is introduced into an outlet of the needle hole 120 formed on a surface of the pressing jig part 100 facing the battery case 13, and a pipe such as a hose connected to an external analysis apparatus is coupled to an inlet of the needle hole 120 formed on a surface of the pressing jig part 100 to which the punching part 400 has been coupled, so that the gas can be delivered to the external analysis apparatus.

Although embodiments according to the present invention have been described above, it will be understood that the embodiments are merely exemplary, and various modifications and other embodiments having equivalent scope can be made from the above embodiments by those skilled in the art. Therefore, the true technical scope of the present invention to be protected should be defined by the following claims.

INDUSTRIAL APPLICABILITY

The gas-collecting apparatus of the present disclosure can be utilized consistently for secondary batteries of all sizes regardless of a change in the specifications of the batteries.

The gas-collecting apparatus of the present disclosure immediately collects gas inside a battery case without requiring a process of diffusing the gas in a separate chamber, thereby reducing a space for gas diffusion. Therefore, since the gas generated in the secondary battery can be collected in a smaller space, it is possible to increase the efficiency of analysis by collecting a high concentration of gas.

A pressing jig part of the gas-collecting apparatus of the present disclosure contacts and presses only a local area of a battery case, and therefore, even if the jig is coupled to the secondary battery, the secondary battery has an exposed area that is not coupled to the jig. This exposed area can be used to connect accessory parts for various analyses.

The gas-collecting apparatus of the present disclosure securely fixes a pressing jig part to only one surface of a battery case, and therefore, even if the shape and size of the secondary battery changes during the analysis, it is possible to smoothly collect the gas without replacing the jig.

Even if the gas-collecting apparatus of the present disclosure is damaged by ignition of the secondary battery, only a pressing jig part or a sealing part needs to be replaced, thereby reducing the maintenance cost of the apparatus.

In the case of an O-ring applied to the structure of the gas-collecting apparatus of the present disclosure, its area is 2 to 1000 times smaller than that of the O-ring used in the conventional collecting apparatuses, thereby effectively improving leakage due to the O-ring.

What is claimed is:

1. A gas-collecting apparatus for collecting gas generated in a secondary battery including an electrode assembly and a rigid battery case accommodating the electrode assembly therein, the gas-collecting apparatus comprising:
    a pressing jig part for pressing one surface of the battery case;
    a sealing part inserted between the pressing jig part and the one surface of the battery case; and
    a fixing unit for fixing the pressing jig part and the battery case in a state that the sealing part is inserted between the pressing jig part and the battery case,
    wherein the pressing jig part is provided with a gas collecting pipe through which the gas generated inside the battery case flows.

2. The gas-collecting apparatus of claim 1, wherein the one surface of the battery case is a first surface, and the other surface of the battery case facing the first surface is a second surface, and
    the fixing unit comprises:
    a supporting jig part contacting the second surface to support the secondary battery;
    a first plate to which the pressing jig part is fixed and which faces the first surface at a position spaced apart therefrom;
    a second plate to which the supporting jig part is fixed and which faces the second surface at a position spaced apart therefrom; and
    a pillar part coupled to the first plate and the second plate so that the first plate and the second plate maintain a certain distance from each other.

3. The gas-collecting apparatus of claim 2, wherein the second plate is provided with:
    a jig guide hole in which the supporting jig part is inserted so as to be movable in a direction perpendicular to the first surface with respect to the second plate; and
    a locking means for fixing a position of the supporting jig part with respect to the second plate.

4. The gas-collecting apparatus of claim 2, wherein a gas discharging pipe for flowing the gas discharged through the gas collecting pipe to an external analysis apparatus is provided inside the first plate,
    wherein the pressing jig part is in contact with and coupled to the first plate,
    wherein the gas collecting pipe is a gas flow path formed inside the pressing jig part,
    wherein an inlet of the gas collecting pipe is formed to face the first surface, and
    wherein an outlet of the gas collecting pipe is formed on a contacting surface between the first plate and the pressing jig part so as to face an inlet of the gas discharging pipe.

5. The gas-collecting apparatus of claim 2, wherein the pillar part extends in a direction perpendicular to the first surface and is provided in plural,
    wherein one end of the pillar part is coupled to the first plate, and the other end of the pillar part is coupled to the second plate.

6. The gas-collecting apparatus of claim 5, wherein the pillar part includes a first pillar part and a second pillar part,
    wherein a virtual line connecting the first pillar part and the second pillar part on a virtual plane including the secondary battery, the first pillar part, and the second pillar part and being parallel to the first surface penetrates the secondary battery.

7. The gas-collecting apparatus of claim 2, wherein the apparatus further comprises a punching part for drilling a ventilating hole on the first surface of the battery case for discharging the gas,
    wherein the punching part is coupled to a surface of the pressing jig part opposite to a surface of the pressing jig part contacting the secondary battery, and
    wherein a needle hole penetrating the inside of the pressing jig part is formed in the pressing jig part so that a needle provided in the punching part protrudes from the surface of the pressing jig part contacting the secondary battery.

8. The gas-collecting apparatus of claim 7, wherein an outlet of the needle hole through which the needle protrudes and an inlet of the gas collecting pipe through which the gas flows in are formed at the same position.

9. The gas-collecting apparatus of claim 8, wherein the needle hole is formed to penetrate the pressing jig part so as to connect the surface of the pressing jig part facing the battery case and the surface of the pressing jig part to which the punching part is coupled,
    wherein the punching part is detachable, and
    wherein the gas generated in the secondary battery is collected through the needle hole in a state that the punching part is separated from the pressing jig part.

10. The gas-collecting apparatus of claim 1, wherein a ventilating hole for discharging the gas generated inside the secondary battery is formed in the one surface of the battery case,
    wherein the sealing part is an O-ring, and
    wherein the sealing part is disposed such that the ventilating hole is located inside a circle of the O-ring.

11. The gas-collecting apparatus of claim 10, wherein the sealing part comprises one or more of silicone rubber, viton, natural rubber and synthetic rubber as a flexible material.

* * * * *